United States Patent [19]

Nespodzany, Jr. et al.

[11] Patent Number: 5,562,349
[45] Date of Patent: Oct. 8, 1996

[54] BEARING ASSEMBLY HAVING THERMAL COMPENSATION

[75] Inventors: Robert P. Nespodzany, Jr., Phoenix; Toren S. Davis, Peoria, both of Ariz.

[73] Assignee: Honeywell Inc., Minneapolis, Minn.

[21] Appl. No.: 567,728

[22] Filed: Dec. 5, 1995

Related U.S. Application Data

[63] Continuation-in-part of Ser. No. 340,502, Nov. 15, 1994, abandoned.

[51] Int. Cl.$^6$ ............................................. F16C 19/52
[52] U.S. Cl. ............................................ 384/493; 384/906
[58] Field of Search ................................ 384/493, 557, 384/905, 906, 912, 537

[56] References Cited

U.S. PATENT DOCUMENTS

| | | |
|---|---|---|
| 5,028,152 | 7/1991 | Hill et al. ............................ 384/557 |
| 5,044,908 | 9/1991 | Kawade ............................... 384/557 |
| 5,052,828 | 10/1991 | Ciokajlo et al. ...................... 384/493 |
| 5,090,823 | 2/1992 | Lindsey et al. ...................... 384/493 |

*Primary Examiner*—Lenard A. Footland
*Attorney, Agent, or Firm*—Thomas A. Rendos

[57] ABSTRACT

A bearing assembly with thermal compensation including a rotor rotatably mounted to a stator by way of a bearing mechanism. The stator and rotor are manufactured from materials having coefficients of thermal expansion substantially different than the coefficient of thermal expansion of the material from which the bearing mechanism is manufactured. The bearing mechanism is defined by a first race, a second race and a plurality of bearing elements. Thermal compensation connectors couple the first and second races to the stator and rotor, respectively. The thermal compensation connectors permit radial expansion and contraction of the stator and rotor relative to the bearing mechanism and prevent rotational displacement of the stator and rotor relative to the first and second races of the bearing mechanism.

20 Claims, 5 Drawing Sheets

BEARING ASSEMBLY HAVING THERMAL COMPENSATION

This application is a continuation-in-part, of application Ser. No. 08/340,502, filed Nov. 15, 1994, abandoned.

BACKGROUND OF THE INVENTION

This invention relates to bearing assemblies. In particular, the present invention is a bearing assembly having thermal compensation connectors that permit expansion and contraction, due to temperature variations, of bearing assembly components having different coefficients of thermal expansion. The invention described herein was made in the performance of work under NASA Contract No. NAS9-18200 and is subject to the provisions of Section 305 of the National Aeronautics and Space Act of 1958 (42 U.S.C. 2457). The invention described herein has been granted NASA Waiver Case No. W-2975.

In the aviation industry and the space industry, it is critical that aircraft and spacecraft systems be manufactured to be as lightweight and durable as possible. In particular with regard to spacecraft, it is essential that lightweight materials be used to manufacture spacecraft components of spacecraft systems, since each incremental increase in spacecraft component weight requires an incremental increase in the amount of rocket fuel required to launch the spacecraft into outer space. Because spacecraft components of spacecraft systems are submitted to high structural stresses and extreme temperature fluctuations within the range of 180° F. to −65° F., it is also essential that spacecraft components be manufactured of materials that are durable. However, it is not always possible to manufacture spacecraft components of a spacecraft system to a desired weight and a desired durability using a single material. Hence, spacecraft systems often are comprised of spacecraft components manufactured of various materials, with the choice of a particular material being dependent upon the purpose served by the particular spacecraft component. For example, spacecraft components subjected to high structural stresses, such as bearings, are typically manufactured from heavy, structurally strong and durable materials, while spacecraft components that are not subjected to extreme structural stresses, such as stator and rotor housings, are typically manufactured from lightweight and less durable materials.

One concern of tailoring the material to the purpose of the spacecraft component is that different materials exhibit different physical properties. One of these physical properties that can vary from one material to the next is the coefficient of thermal expansion. When inner and outer parts of different materials having different coefficients of thermal expansion are fitted together at one temperature (the material of the inner pan having a smaller coefficient of thermal expansion than the material of the outer part) then brought to a cooler temperature, a contact pressure is created between the inner and outer parts due to the outer part shrinking faster than the inner part. This contact pressure creates a compressive stress in the inner part material and a tensile stress in the outer part material. These stresses are undesirable and can cause part failure or deformation which may affect the operation of the parts. If the inner and outer parts are brought to a temperature warmer than the temperature at which the pans were initially assembled, a gap will form between the inner and outer parts, due to the outer part growing faster than the inner part. This gap is undesirable since the inner part is no longer held securely by the outer part.

This undesirable contact pressure/gap is especially acute in the spacecraft environment, and in particular, spacecraft bearing assemblies. Typically, a spacecraft bearing assembly is defined by a bearing mechanism, an inner housing and an outer housing. The bearing mechanism is made of steel (a durable, we are resistant material), and is fitted between the inner and outer housings, which are made of aluminum (a lightweight material). The steel of the bearing mechanism has a coefficient of thermal expansion of $6.5 \times 10^{-6}$ in./in.−° F., while the aluminum of the inner and outer housings has a coefficient of thermal expansion of $12.4 \times 10^{-6}$ in./in.−° F. Typically, the housings and bearing mechanism are press fit together at one temperature (i.e., room temperature within the range of 60° F. to 80° F.). In the environment of space, the housings and bearing mechanism, are subjected to temperature variations within the range of 180° F. to −65° F. These temperature variations, together with the differing coefficients of thermal expansion of steel and aluminum, cause the housings and bearing mechanism to expand and contract at different rates. In turn, this differential expansion and contraction causes contact pressure/gaps between the bearing mechanism and the housings, which results in large bearing stresses and high drag torque and ultimately shorter bearing life.

There is a need for improved bearing assemblies. In particular, there is a need for a bearing assembly with thermal compensation that will virtually eliminate bearing stresses due to the affects of extreme temperature fluctuations on the materials (having differing coefficients of thermal expansion) of the bearing assembly components. The bearing assembly should provide thermal compensation while maintaining a weight efficient structure.

SUMMARY OF THE INVENTION

The present invention is a bearing assembly with thermal compensation. The bearing assembly includes stator means, rotor means bearing means and thermal compensation means. The stator means is formed of a first material having a first coefficient of thermal expansion, and the rotor means is formed of a second material having a second coefficient of thermal expansion. A bearing means of the bearing assembly permits rotation of the rotor means relative to the stator means about an axis. The bearing means includes a first race, a second race and a plurality of bearing elements. The first and second races and bearing elements are formed of a third material having a third coefficient of thermal expansion that is different than the first and second coefficients of thermal expansion. Thermal compensation means of the bearing assembly couples the first and second races to the stator and rotor means, respectively. The thermal compensation means permits radial movement of the bearing means relative to the stator and rotor means in a direction perpendicular to the axis, and prevents rotational displacement of the stator and rotor means relative to the first and second races, respectively, due to the effect of temperature variations on the materials of the stator, rotor and bearing means.

This bearing assembly with thermal compensation virtually eliminates bearing stresses due to the affects of extreme temperature fluctuations on the materials (having differing coefficients of thermal expansion) of the bearing assembly components. In particular, the thermal compensation means permits differential expansion and contraction of the bearing, stator and rotor means without the contact pressure/gaps normally associated with the use of materials having different coefficients of thermal expansion in bearing assembly components. By eliminating contact pressure/gaps between bearing assembly components, the thermal compensation means virtually eliminates the effects of contact pressure/ gaps, such as large bearing stresses, high drag torque and ultimately shorter bearing life. In addition, this bearing assembly with thermal compensation permits differential expansion and contraction of bearing assembly components, as a result of temperature variations, while maintaining a weight efficient structure.

DETAILED DESCRIPTION OF THE PREFERRED EMBODIMENT

Figure 1:
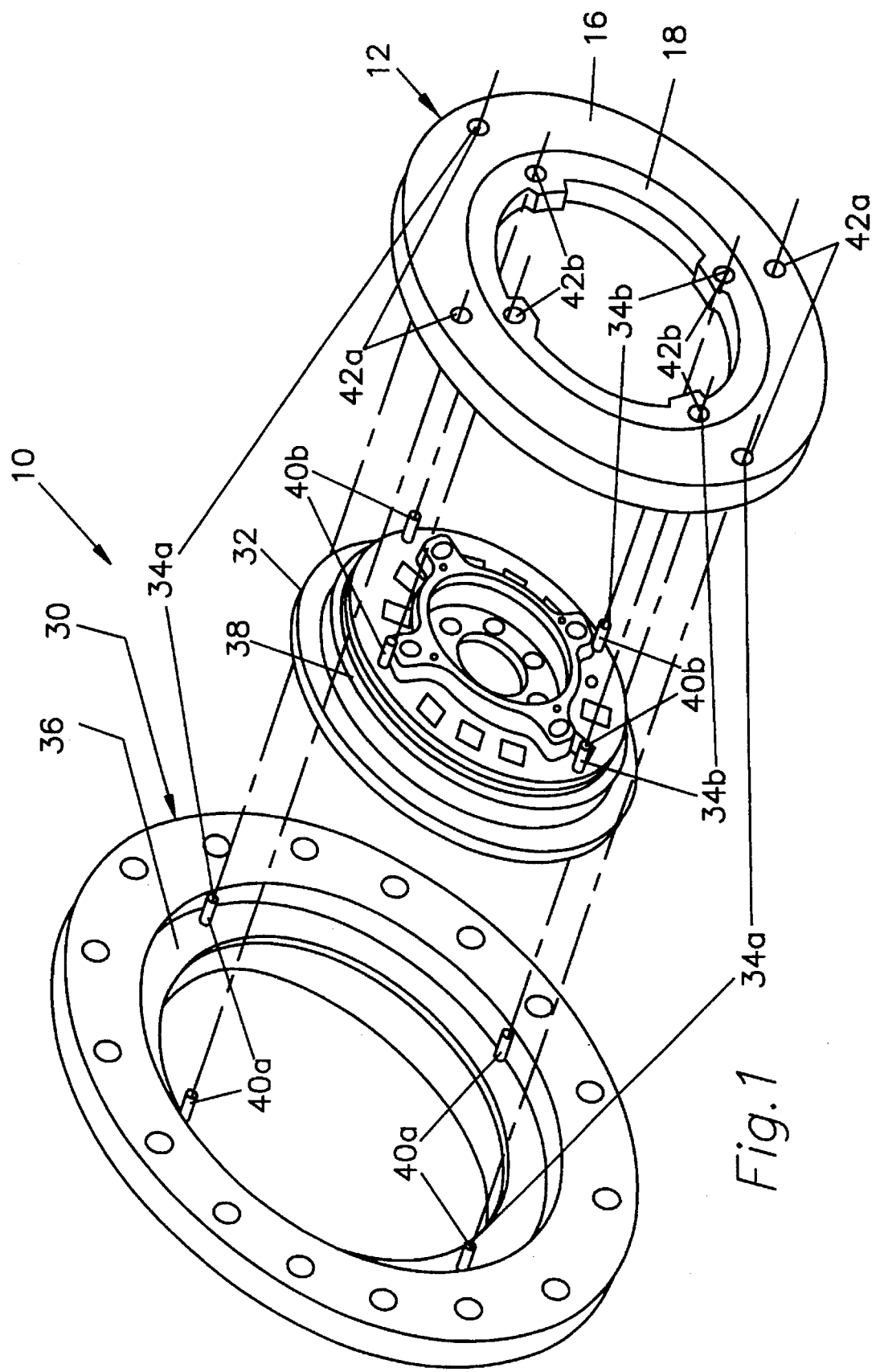
FIG. 1 is an exploded perspective view of a bearing assembly in accordance with the present invention.
Figure 2:
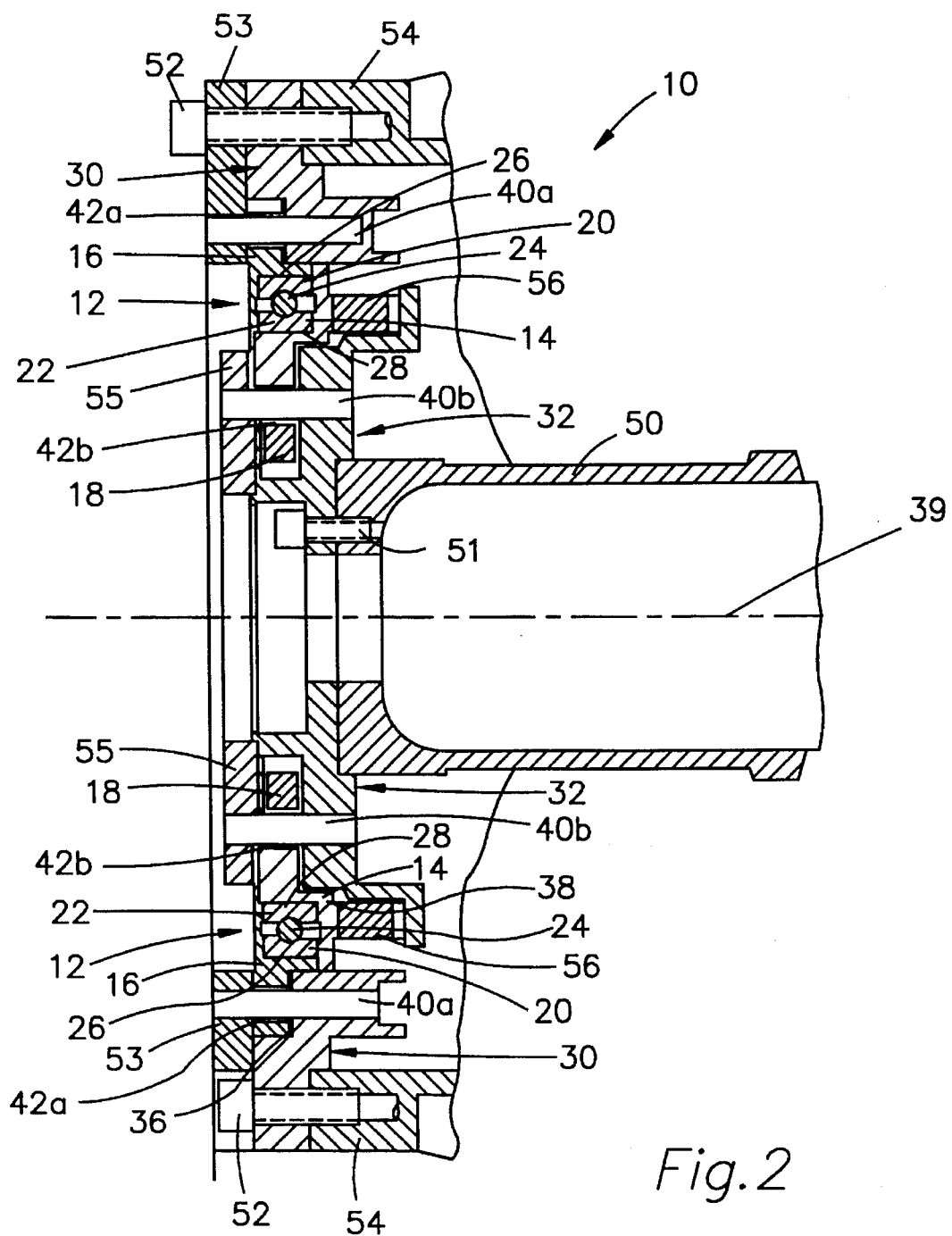
FIG. 2 is an assembled sectional view of the bearing assembly shown in FIG. 1.

A bearing assembly 10 in accordance with the present invention is illustrated generally in FIGS. 1 and 2. As seen best in FIG. 2, the bearing assembly 10 includes a bearing mechanism 12 defined by a bearing member 14, an outer bearing retainer 16 and an inner bearing retainer 18. The bearing member 14 is defined by an outer bearing race 20, an inner bearing race 22 and a plurality of ball bearings 24. The outer bearing retainer 16 has a stepped portion 26 for supporting the outer bearing race 20 and the inner bearing retainer 18 has a stepped portion 28 for supporting the inner bearing race 22. The ball bearings 24 are supported by the outer and inner bearing races 20 and 22, such that the inner bearing race 22, and therewith, the inner bearing retainer 18 can rotate relative to the outer bearing race 20 and the outer bearing retainer 16. In one embodiment, the outer and inner bearing retainers 16 and 18, the outer and inner bearing races 20 and 22 and the ball bearings 24 of the bearing mechanism 12 are all preferably manufactured of steel, such as 440 C. steel having a coefficient of thermal expansion of $6.5 \times 10^{-6}$ in./in.–° F.

As seen best in FIG. 1, the bearing assembly 10 further includes a stator 30 and a rotor 32. Thermal compensation means, of the bearing assembly 12, is defined by thermal compensation connectors 34a and 34b (only a few of which are identified in FIG. 1 for clarity). Thermal compensation connectors 34a couple the stator 30 to the outer bearing retainer 16 and the thermal compensation connectors couple the rotor 32 to the inner bearing retainer 18. The thermal compensation connectors 34a and 34b are substantially similar and as such, like numerals indicate like parts with the appropriate subscript letter designation (i.e., "a" or "b"). The stator 30 has a stepped region 36 for receiving the outer bearing retainer 16 which in turn supports the outer bearing race 20. The rotor 32 has a stepped region 38 for receiving the inner bearing retainer 18 which in turn supports the inner bearing race 22. The bearing mechanism 12, which includes the bearing member 14, allows rotation of the rotor 32 relative to the stator 30 about an axis 39 (see FIG. 2).

As seen in FIGS. 1 and 2, each of the thermal compensation connectors 34a, 34b is defined by an elongated support pin 40a, 40b that is cylindrical in shape. Each of the support pins 40a, 40b is moveably received within a respective elongated slot 42a, 42b that forms part of the thermal compensation connectors 34a, 34b. As seen best in FIG. 2, the support pins 40a, 40b are oriented such that they extend substantially parallel to the axis 39. As seen best in FIGS. 1 and 3–6, each of the elongated slots 42a, 42b has a width and a length with the length being greater than the width. Each of the elongated slots 42a, 42b is oriented such that its length extends radially from and is perpendicular to the axis 39.

In one embodiment, the stator 30 and the rotor 32 are preferably manufactured of aluminum having a coefficient of thermal expansion of $12.4 \times 10^{6}$ in./in.–° F. In this same embodiment, the support pins 40a, 40b are preferably manufactured of stainless steel, and the support pins 40a, 40b are press fit into apertures in the stator 30 and rotor 32. In addition, in this same embodiment, the elongated slots 42a are each 0.1257±0.0002 in. in width and 0.1314±0.001 in. in length, while the elongated slots 42b are each 0.1257±0.0002 in. in width and 0.1297±0.001 in. in length. Further, in this same embodiment, the support pins 40a, 40b are each 0.1249±0.0002 in. in diameter. The dimensions of the elongated slots 42a, 42b relative to the support pins 40a, 40b have been exaggerated in FIGS. 3–6 for clarity.

In the one embodiment illustrated in FIGS. 1 and 2, the support pins 40a are mounted on the stepped region 36 of the stator 30 and are received in the elongated slots 42a which are formed in the outer bearing retainer 16. In addition, in this same embodiment the support pins 40b are mounted on the rotor 32 and are received in the elongated slots 42b which are formed in the inner bearing retainer 18. However, it is to be understood that one or more of the support pins 40a, 40b could be mounted on the outer and inner bearing retainers 16 and 18, respectively, with corresponding elongated slots 42a, 42b being formed in the stator 30 and rotor 32, respectively.

Figure 3:
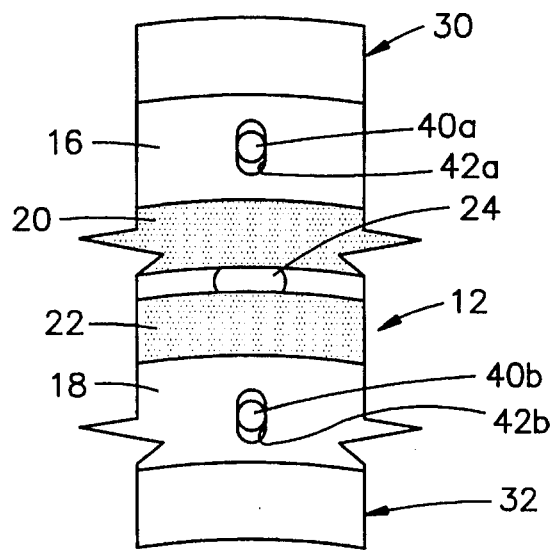
FIG. 3 is an enlarged, schematic elevational view of a section of the bearing assembly of FIG. 1, showing a relative disposition of bearing assembly components at a desired emplacement temperature.

In practice the stator 30, the rotor 32 and the bearing mechanism 12 are fitted together at an emplacement temperature, such as room temperature which is within the range of 60° F. to 80° F. Once fitted, the support pins 40a are engaged with the elongated slots 42a and the support pins 40b are engaged with the elongated slots 42b. FIG. 3 illustrates the relative disposition of the support pins 40a, 40b within the elongated slots 42a, 42b at the emplacement temperature.

In the environment of space, the stator 30, the rotor 32 and the bearing mechanism 12 are subjected to temperature variations within the range of 180° F. to −65° F. These temperature fluctuations, together with the differing coefficients of thermal expansion of steel (i.e., the material from which the components of the bearing mechanism 12 were formed) and aluminum (i.e., the material from which the stator 30 and rotor 32 were formed) cause the bearing mechanism 12 to radially expand and contract at a rate different than the radial rate of expansion and contraction of the stator 30 and rotor 32.

The thermal compensation connectors 34a, 34b permit radial movement (i.e., radial expansion and contraction) of the bearing mechanism 12 relative to the stator 30 and rotor 32 in a direction perpendicular to the axis 39 and prevent rotational displacement of the stator 30 and rotor 32 relative to the outer and inner bearing retainers 16 and 18, due to the effect of temperature variations on the materials used to manufacture the stator 30, rotor 32 and components of the bearing mechanism 12. The thermal compensation connectors 34a, 34b permit radial expansion and contraction (due to temperature fluctuations) of the bearing mechanism 12 relative to the stator 30 and rotor 32, because the support pins 40a, 40b and respective elongated slots 42a, 42b are linearly moveable relative to one another along the lengths of the elongated slots 42a, 42b. Hence, throughout the temperature range of 180° F. to −65° F., the thermal compensation connectors 34a, 34b virtually eliminate bearing stresses due to the effects of temperature variations on the bearing assembly 10, while maintaining the required concentric disposition of the stator 30, rotor 32 and bearing mechanism 12. The elongated slots 42a are slightly greater in length then the elongated slots 42b, because the amount of thermal expansion or contraction of the stator 30, rotor 32 and bearing mechanism 12 is dependent not only on the coefficients of thermal expansion of the materials from which the stator 30, rotor 32 and bearing mechanism 12 are manufactured, but is also a product of the diameters of the stator 30, rotor 32 and bearing mechanism 12 and the change in temperature.

Figure 4:
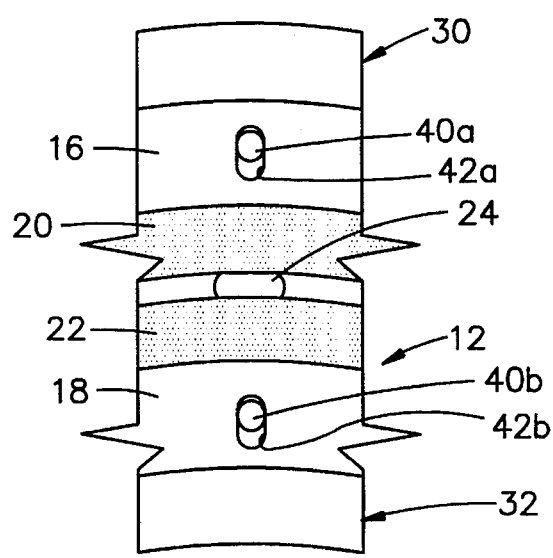
FIG. 4 is an enlarged, schematic elevational view similar to FIG. 3 but with the relative disposition of the bearing assembly components being shown at a temperature greater than the desired emplacement temperature.

FIG. 4 illustrates the relative disposition of the support pins 40a, 40b within the elongated slots 42a, 42b at a temperature greater than the desired emplacement temperature. At temperatures higher than the emplacement temperature, the rotor 32 is free to grow radially outward toward the bearing mechanism 12 without radially contacting the bearing mechanism 12. Therefore, expansion of the rotor 32 does not impart any tensile radial loads to the bearing mechanism 12. In addition, at temperatures higher than the emplacement temperature, the stator 30 is free to grow radially outward away from the bearing mechanism 12, but cooperation between the support pins 40a and the elongated slots 42a ensures that the bearing mechanism 12 is securely held by the stator 30.

Figure 5:
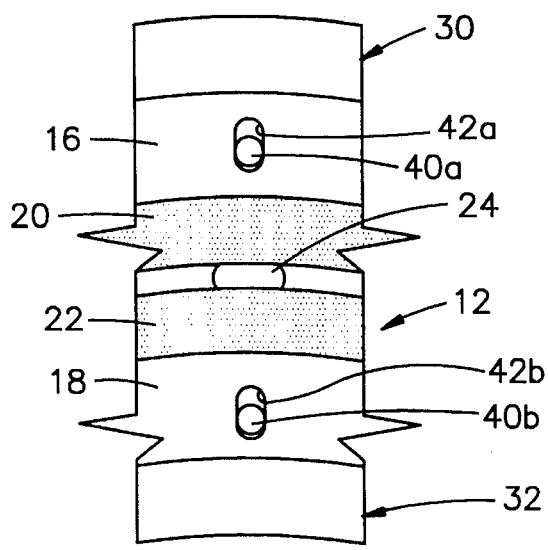
FIG. 5 is an enlarged, schematic elevational view similar to FIG. 3 but with the relative disposition of the bearing assembly components being shown at a temperature less than the desired emplacement temperature.
Figure 6:
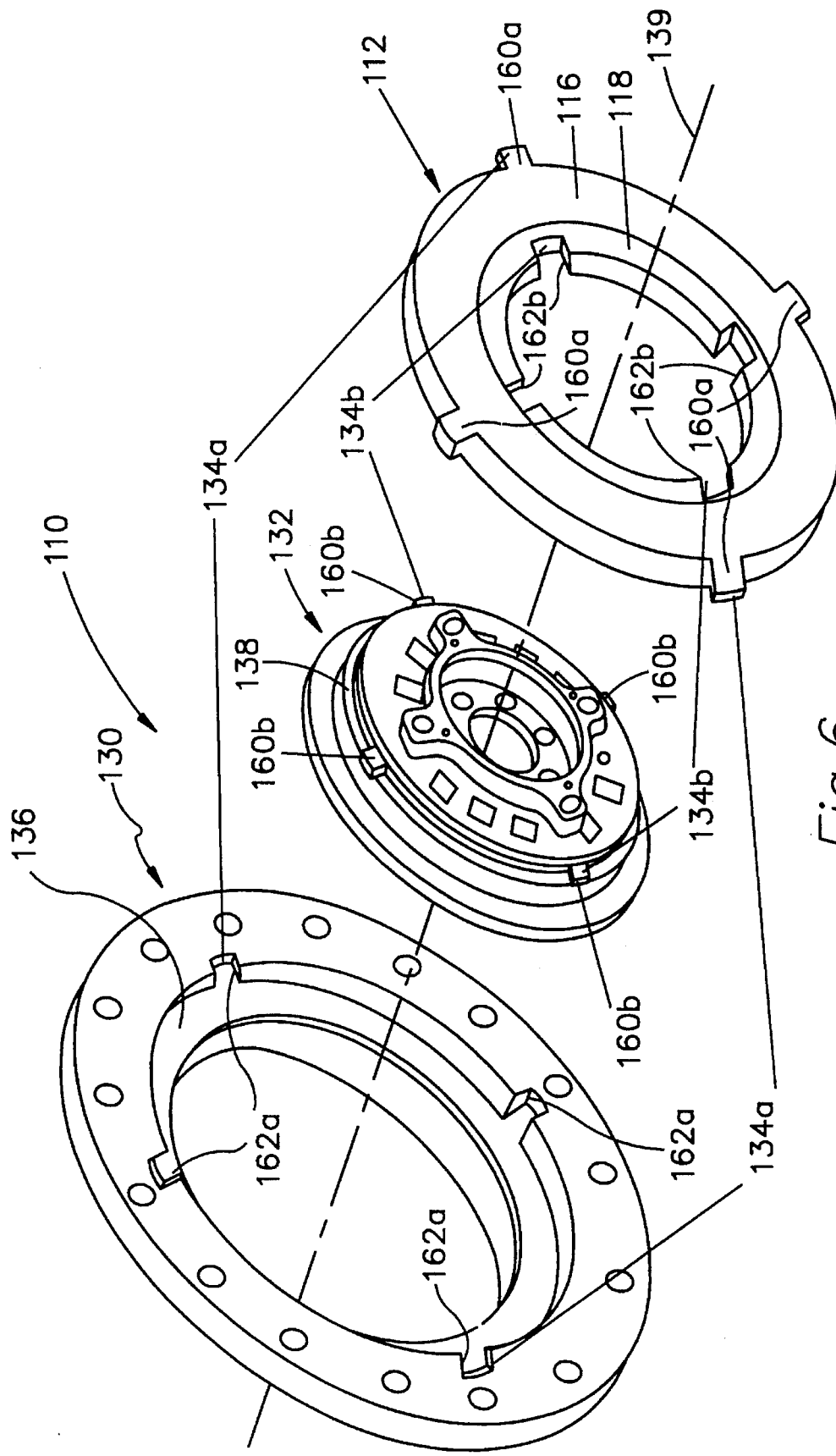
FIG. 6 is an exploded perspective view of an alternative embodiment of a bearing assembly in accordance with the present invention.

FIG. 5 illustrates the relative disposition of the support pins 40a, 40b within the elongated slots 42a, 42b at a temperature less than the desired emplacement temperature. At temperatures lower than the emplacement temperature, the stator 30 is free to shrink radially inward toward the bearing mechanism 12 without radially contacting the bearing mechanism 12. Therefore, contraction of the stator 30 does not impart any compressive radial loads to the bearing mechanism 12. In addition, at temperatures lower than the emplacement temperature, the rotor 32 is free to shrink radially inward away from the bearing mechanism 12, but cooperation between the support pins 40b and the elongated slots 42b ensures that the bearing mechanism 12 is securely held by the rotor 32.

As seen in FIGS. 1 and 2, load transfer to/from the bearing mechanism 12 from/to the stator 30 and rotor 32 is accomplished through the support pins 40a, 40b. In the one embodiment illustrated in FIGS. 1 and 2, the stator 30 and rotor 32 each have four equally spaced support pins 40a and 40b, respectively. However, load transfer capabilities may be increased by adding more support pins 40a, 40b and respective elongated slots 42a, 42b, or by increasing the diameter of the support pins 40a, 40b. In addition, it is to be understood that the concentricity of the stator 30, rotor 32 and bearing mechanism 12 is maintained throughout any temperature range, as long as at least three of each of the temperature compensation connectors 34a and 34b are used.

In the one embodiment illustrated in FIG. 2, the bearing assembly 10 forms part of a Power Data Transfer Assembly (PDTA). The rotor 32 is an inner roll ring retainer which is secured to a roll ring shaft 50 via bolts 51. The stator 30 is an outer roll ring retainer. Bolts 52 secure an outer end bearing retainer 53 and stator 30 to a roll ring housing 54. An inner end bearing retainer 55 is secured to the rotor 32. The bearing mechanism 12 is a floating simplex bearing mechanism that provides an axial degree of freedom so that axial loads (due to temperature fluctuations) between the rotor and stator will not overload the bearing mechanism 12. A bearing preload spring 56 loads the bearing. However, it is to be understood that the bearing assembly 10 is useful in other devices, such as resolvers, encoders or rocket nozzle structures.

FIGS. 6-9 illustrate an alternative bearing assembly embodiment 110. Like parts are labeled with like numerals except for the addition of the prescript 1. In the bearing assembly 110, each of the thermal compensation connectors 134a, 134b is defined by a spline tooth 160a, 160b. Each of the spline teeth 160a, 160b is moveably received within a respective elongated channel 162a, 162b that forms part of the thermal compensation connectors 134a, 134b. The elongated channels 162a are formed in the stepped region 136 of the stator 130 and the elongated channels 162b are formed in the inner bearing retainer 118. The spline teeth 160a are located on the outer bearing retainer 116 and the spline teeth 160b are located on the stepped region 138 of the rotor 132. In addition, the spline teeth 160a, 160b are oriented such that they extend substantially radially perpendicular to the axis 139 (see FIG. 6). Otherwise, the thermal compensation connectors 134a, 134b, as defined by the spline teeth 160a, 160b and elongated channels 162a, 162b, function in the same manner as the thermal compensation connectors 34a, 34b, as defined by the support pins 40a, 40b and the elongated slots 42a, 42b.

Figure 7:
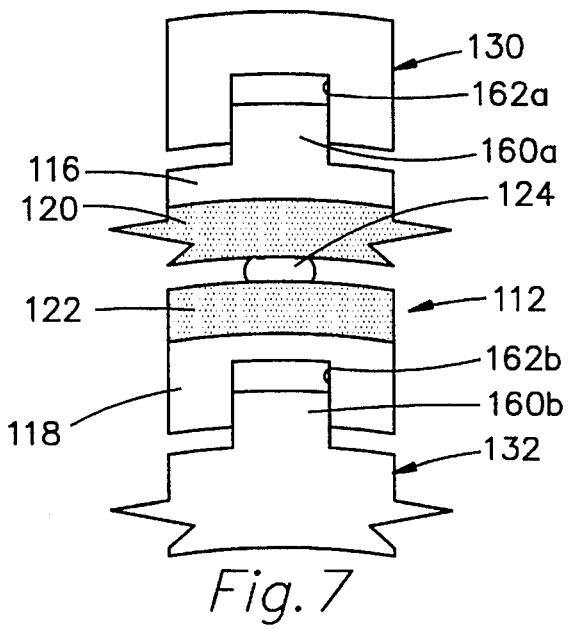
FIG. 7 is an enlarged, schematic elevational view of a section of the alternative embodiment of the bearing assembly of FIG. 6, showing a relative disposition of bearing assembly components at a desired emplacement temperature.

The thermal compensation connectors 134a, 134b permit radial movement (i.e., radial expansion and contraction) of the bearing mechanism 112 relative to the stator 130 and the rotor 132 in a direction perpendicular to the axis 139 and prevent rotational displacement of the stator 130 and rotor 132 relative to the outer and inner bearing retainers 116 and 118, due to the effect of temperature variations on the materials used to manufacture the stator 130, rotor 132 and components of the bearing mechanism 112. The thermal compensation connectors 134a, 134b permit radial expansion and contraction (due to temperature fluctuations) of the bearing mechanism 112 relative to the stator 130 and rotor 132, because the spline teeth 160a, 160b and respective elongated channels 162a, 162b are linearly moveable relative to one another. FIG. 7 illustrates the relative disposition of the spline teeth 160a, 160b within the elongated channels 162a, 162b at the emplacement temperature.

Figure 8:
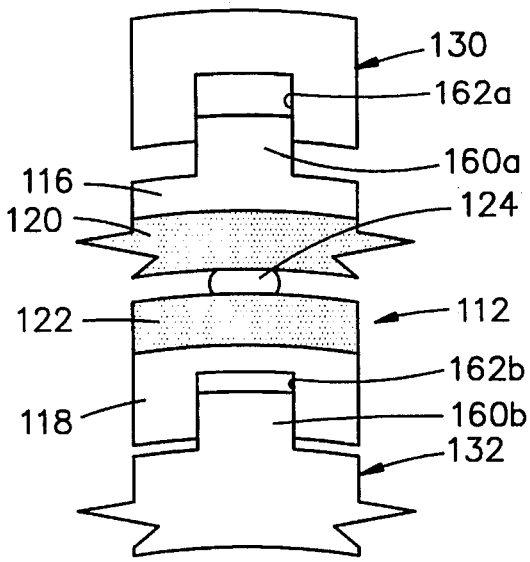
FIG. 8 is an enlarged, schematic elevational view similar to FIG. 7 but with the relative disposition of the bearing assembly components being shown at a temperature greater than the desired emplacement temperature.

FIG. 8 illustrates the relative disposition of the spline teeth 160a, 160b within the elongated channels 162a, 162b at a temperature greater than the desired emplacement temperature. At temperatures higher than the emplacement temperature, the rotor 132 is free to grow radially outward toward the bearing mechanism 112 without radially contacting the bearing mechanism 112. Therefore, expansion of the rotor 132 does not impart any tensile radial loads to the bearing mechanism 112. In addition, at temperatures higher than the emplacement temperattire, the stator 130 is free to grow radially outward away from the bearing mechanism 112, but cooperation between the spline teeth 160a and the elongated channels 162a ensures that the bearing mechanism 112 is securely held by the stator 130.

Figure 9:
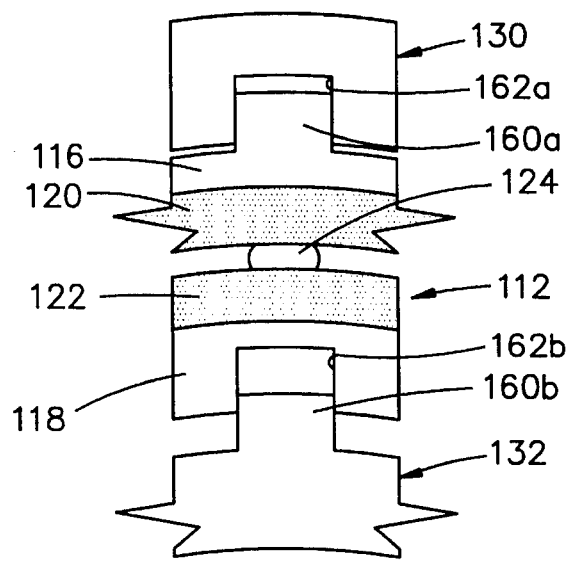
FIG. 9 is an enlarged, schematic elevational view similar to FIG. 7 but with the relative disposition of the bearing assembly components being shown at a temperature less than the desired emplacement temperature.

FIG. 9 illustrates the relative disposition of the spline teeth 160a, 160b within the elongated channels 162a, 162b at a temperature less than the desired emplacement temperature. At temperatures lower than the emplacement temperature, the stator 130 is free to shrink radially inward toward the bearing mechanism 112 without radially contacting the bearing mechanism 112. Therefore, contraction of the stator 130 does not impart any compressive radial loads to the bearing mechanism 112. In addition, at temperatures lower than the emplacement temperature, the rotor 132 is free to shrink radially inward away from the bearing mechanism 112, but cooperation between the spline teeth 160b and the elongated channels 162b ensures that the bearing mechanism 112 is securely held by the rotor 132.

This bearing assembly 10, 110 with thermal compensation virtually eliminates bearing stresses due to the affects of extreme temperature fluctuations on the materials (having differing coefficients of thermal expansion) of the bearing assembly components. In particular, the thermal compensation connectors 34a, 34b, 134a, 134b permit differential expansion and contraction of the bearing mechanism 12, 112 stator 30, 130 and rotor 32, 132 without the contact pressure/ gaps normally associated with the use of materials having different coefficients of thermal expansion in bearing assembly' components. By eliminating contact pressure/gaps between bearing assembly components, the thermal compensation connectors 34a, 34b, 134a, 134b virtually eliminate the unwanted effects of contact pressure/gaps, such as large bearing stresses, high drag torque and ultimately shorter bearing life. In addition, this bearing assembly 10, 110 with thermal compensation permits differential expansion and contraction of bearing assembly components, as a result of temperature variations, while maintaining a weight efficient structure.

Although the present invention has been described with reference to preferred embodiments, workers skilled in the art will recognize that changes may be made in form and detail without departing from the spirit and scope of the invention.

We claim:

1. A bearing assembly with thermal compensation, comprising:

stator means formed of a first material having a first coefficient of thermal expansion;

rotor means formed of a second material having a second coefficient of thermal expansion;

bearing means for permitting rotation of the rotor means relative to the stator means about an axis, the bearing means including a first race, a second race and a plurality of bearing elements, the first and second races and bearing elements being formed of a third material having a third coefficient of thermal expansion that is different than the first and second coefficients of thermal expansion; and thermal compensation means for coupling the first and second races to the stator and rotor means, respectively, the thermal compensation means permitting radial movement of the bearing means relative to the stator and rotor means in a direction perpendicular to the axis and preventing rotational displacement of the stator and rotor means relative to the first and second races, respectively, due to the effect of temperature variations on the materials of the stator, rotor and bearing means.

2. The bearing assembly of claim 1 wherein the thermal compensation means includes a plurality of elongated support members engageable with a plurality of elongated slots, cooperation between the support members and slots permitting relative movement therebetween, and therewith, relative radial movement between the bearing means and the stator and rotor means as a result of the effect of temperature variations on the materials of the stator, rotor and bearing means.

3. The bearing assembly of claim 1 wherein the thermal compensation means includes:

a plurality of elongated slots in one of the stator means and the first race;

a plurality of support pins on one of the other of the stator means and the first race, the plurality of elongated slots being configured to receive the plurality of support pins so as to permit relative movement between the plurality of slots and pins, and therewith, relative radial movement between the stator and bearing means as a result of the effect of temperature variations on the materials of the stator and bearing means.

4. The bearing assembly of claim 3 wherein the thermal compensation means further includes:

a further plurality of elongated slots in one of the rotor means and the second race;

a further plurality of support pins on one of the other of the rotor means and the second race, the further plurality of elongated slots being configured to receive the further plurality of support pins so as to permit relative movement between the further plurality of slots and pins, and therewith, relative radial movement between the rotor and bearing means as a result of the effect of temperature variations on the materials of the rotor and bearing means.

5. The bearing assembly of claim 4 wherein the plurality of elongated slots are in the first race of the bearing means and the plurality of support pins are on the stator means.

6. The bearing assembly of claim 5 wherein the further plurality of elongated slots are in the second race of the bearing means and the further plurality of support pins are on the rotor means.

7. The bearing assembly of claim 3 wherein the plurality of elongated slots and support pins includes at least three elongated slots and support pins, with each of the at least three elongated slots being configured to receive a corresponding support pin of the at least three support pins.

8. The bearing assembly of claim 4 wherein the further plurality of elongated slots and support pins includes at least three elongated slots and support pins, with each of the at least three elongated slots being configured to receive a corresponding support pin of the at least three support pins.

9. The bearing assembly of claim 4 wherein each of the elongated slots of the plurality and further plurality of elongated slots has a width and a length with the length being greater than the width, and wherein each of the elongated slots of the plurality and further plurality of elongated slots is oriented such that its length is perpendicular to the axis.

10. The bearing assembly of claim 4 wherein the plurality and further plurality of elongated slots are equally spaced about the first and second races of the bearing means.

11. The bearing assembly of claim 4 wherein the plurality and further plurality of support pins are oriented such that they extend substantially parallel to the axis.

12. The bearing assembly of claim 1 wherein the first coefficient of thermal expansion of the first material is substantially equal to the second coefficient of thermal expansion of the second material.

13. The bearing assembly of claim 1 wherein the first and second coefficients of thermal expansion of the first and second materials, respectively, are greater than the third coefficient of thermal expansion of the third material.

14. The bearing assembly of claim 13 wherein the first coefficient of thermal expansion of the first material is substantially equal to the second coefficient of thermal expansion of the second material.

15. The bearing assembly of claim 1 wherein the first material is substantially identical to the second material.

16. The bearing assembly of claim 15 wherein the first and second material are aluminum.

17. The bearing assembly of claim 16 wherein the third material is steel.

18. The bearing assembly of claim 1 wherein the thermal compensation means includes:

a plurality of elongated channels in one of the stator means and the first race;

a plurality of spline teeth on one of the other of the stator means and the first race, the plurality of elongated channels being configured to receive the plurality of spline teeth so as to permit relative movement between the plurality of channels and teeth, and therewith, relative radial movement between the stator and bearing means as a result of the effect of temperature variations on the materials of the stator and bearing means.

19. The bearing assembly of claim 18 wherein the thermal compensation means further includes:

a further plurality of elongated channels in one of the rotor means and the second race;

a further plurality of spline teeth on one of the other of the rotor means and the second race, the further plurality of elongated channels being configured to receive the further plurality of spline teeth so as to permit relative movement between the further plurality of channels and teeth, and therewith, relative radial movement between the rotor and bearing means as a result of the effect of temperature variations on the materials of the rotor and bearing means.

20. The bearing assembly of claim 19 wherein the plurality and further plurality of spline teeth are oriented such that they extend substantially radially perpendicular to the axis.

* * * * *